Figure 4:
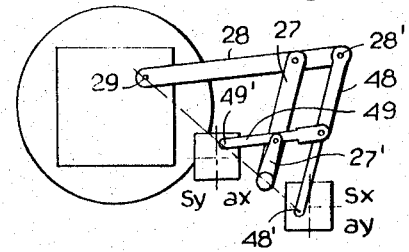

March 7, 1967 E. SANTONI 3,307,450
PHOTOGRAMMETRIC PLOTTING APPARATUS
Filed July 9, 1963 3 Sheets-Sheet 1
Fig. 1 - PRIOR ART
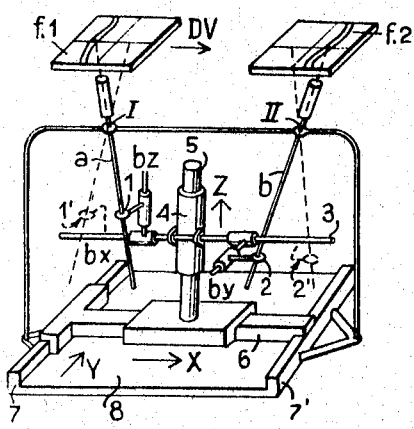
Fig. 2
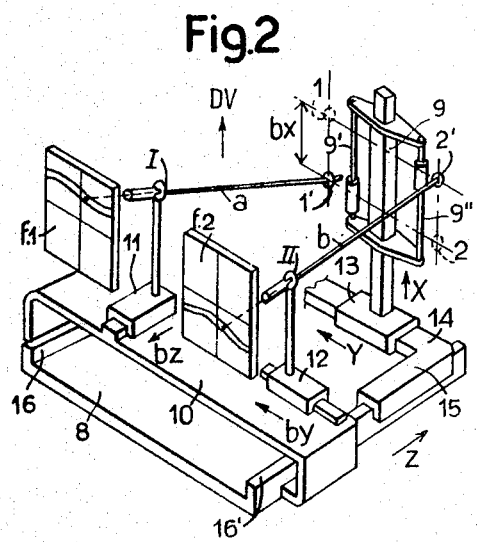
Fig. 3
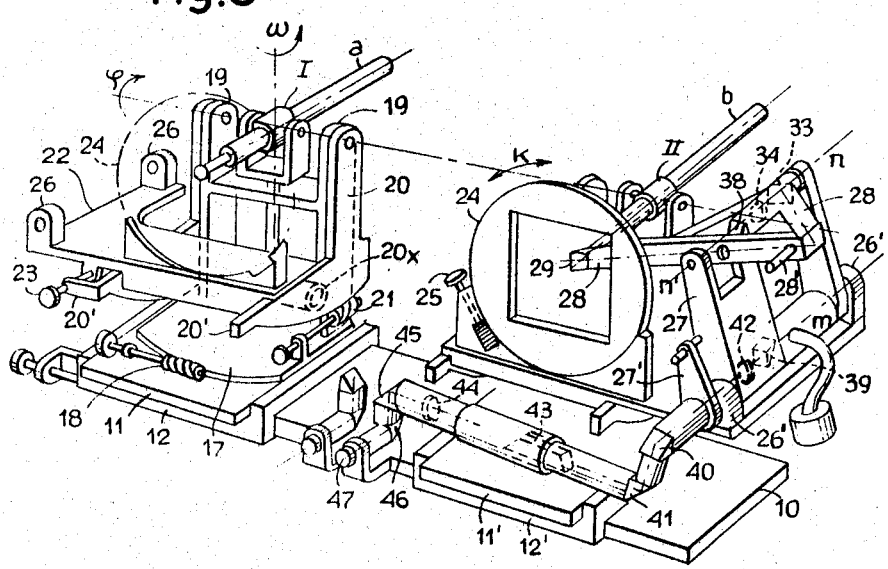
INVENTOR:
ERMENEGILDO SANTONI
BY E. M. Squire
ATTY March 7, 1967  E. SANTONI  3,307,450
PHOTOGRAMMETRIC PLOTTING APPARATUS
Filed July 9, 1963  3 Sheets-Sheet 2

INVENTOR
ERMENEGILDO SANTONI
by E. M. Squire
ATTY

INVENTOR:
ERMENEGILDO SANTONI
BY E. M. Squire
ATTY.

United States Patent Office 3,307,450
Patented Mar. 7, 1967

3,307,450
PHOTOGRAMMETRIC PLOTTING APPARATUS
Ermenegildo Santoni, Via Leonardo Ximenes 25,
Florence, Italy
Filed July 9, 1963, Ser. No. 293,757
Claims priority, application Italy, July 11, 1962,
14,040/62
6 Claims. (Cl. 33—1)

The increasing use of photogrammetric plots in which very high accuracies are required, impels the design of plotting apparatus wherein instrument errors are minimized. Errors may take the form of regular or irregular deformations of the photographic images, especially those obtained on films, because of the strains on, or deformations of, said films due to the developers and subsequent drying as well as to hydrometric movement of the film. In some cameras during exposure the film is flattened against a flat and parallel surface glass pane, on which reference marks (such as crosses) are engraved on the face contacting the film in suitable positions, images of the marks being reproduced on said film.

The object of the present invention is to provide a photogrammetric plotting apparatus of the type known as the homologous vision mechanical projection (controlled, as usual, through guide rods universally-jointed), which involves some mechanical devices coupling the guide rods to the carriages X, Y, Z and optical-mechanical devices in the collimation system, designed per se to minimize the instrument, i.e. systematic, projection errors, and auxiliary devices, prefereably automatically inclinable by means of variable profile cams, inserted in the collimation optical system, the whole for the purpose of eliminating or reducing residual systematic errors and finally, additional auxiliary devices, also automatically operated by variable profile cams, designed to eliminate the errors due to deformation of the photographic images, i.e. the incidental errors, and preferably through small translational movements of the photogram to bring indicia on glass surfaces in contact with the photogram into coincidence with indicia on relatively movable glass surface adjacent to the photogram, or in any other way so that for each position scanned on the photogram the coincidence of the indicia is automatically effected through the auxiliary devices, according to which the means actuating them is an integral part of the optical collimation device.

Accordingly the present invention provides a photogrammetric plotting apparatus including a mounting for a photogram and a movable optical viewing system adjacent to the mounting, which system includes a support member pivotable about an axis transverse to the mounting and carrying a scanning arm pivotable about an axis parallel to the first axis, in which the member and the arm enclose portions of the optical path, and in which the system includes means to project a portion of the image of the photogram and a reference collimation indicium jointly along the optical path, the apparatus also including a pantograph mechanism hinged to the member and to the arm whereby two cam followers move in accordance with the movements of the outer end of the scanning arm, a pair of face cams urged into contact with each cam follower, one cam of each pair being connected to means to effect translational movement in one direction of the mounting, and the other cam of each pair being connected to means to effect relative pivotal movement between the mounting and reticle positioned adjacent to the photogram, about an axis substantially in parallel with the plane of the mounting, as the scanning arm scans the photogram, to compensate for the systematic and incidental errors in the photogram.

Figure 5:
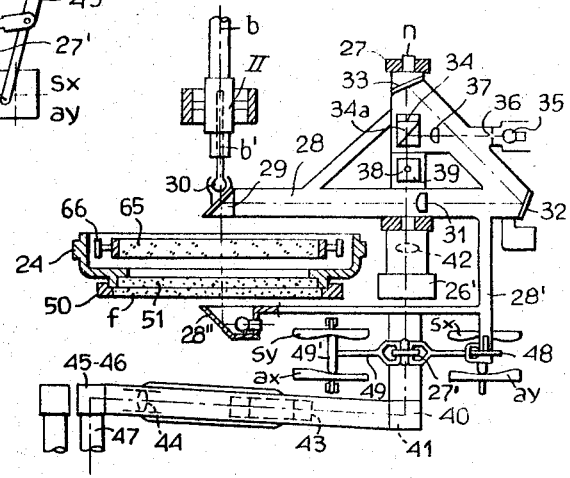
Figure 6:
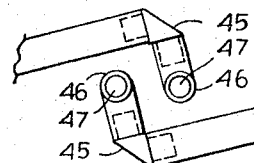
Figure 7:
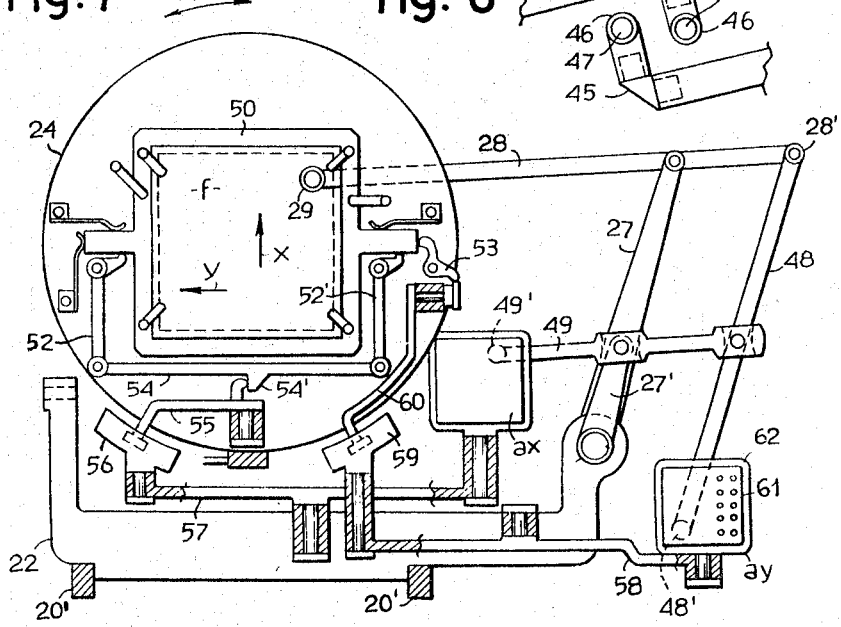
Figure 8:
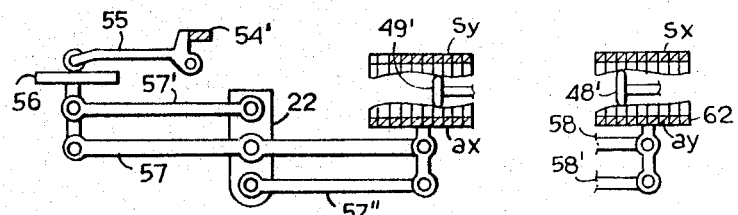
Figure 9:
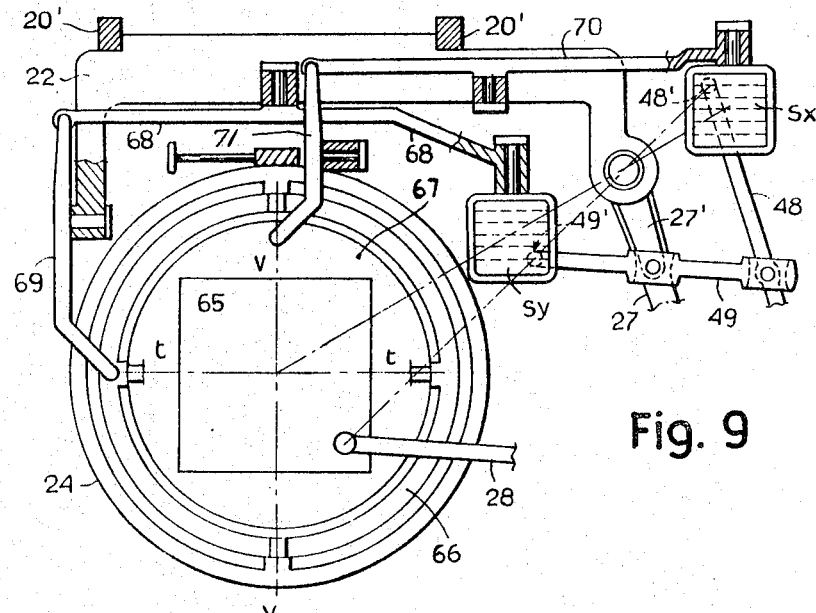
Figure 10:
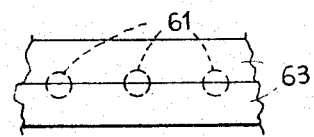
Figure 11:
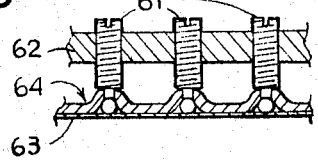

The present invention is illustrated by way of example in the accompanying drawings, in which:

FIG. 1 illustrates a known plotting apparatus;
FIG. 2 illustrates a diagrammatic plotting apparatus of the present invention;
FIG. 3 is a perspective view of the main members of the apparatus shown in FIG. 2, said instrument being formed by two allochiral portions, some members being omitted for clarity of illustration;
FIG. 4 is a diagram of a pantograph mechanism operating the correction members, connected to the collimation optical device;
FIG. 5 is a plan view, partly in section, of the right hand portion of the instrument and representing diagrammatically the auxiliary correction devices;
FIG. 6 is a structural detail of the optical system adjacent to the eyepieces;
FIG. 7 is a front elevation of means for compensating for the photographic image deformations (incidental errors);
FIG. 8 is a plan view of some parts shown in FIG. 7;
FIG. 9 is a rear elevation showing details of the correction member of the residual errors due to the projection members of the plotting apparatus (systematic errors), and
FIGS. 10 and 11 are views of adjustable cams used in the apparatus.

As shown in FIG. 1—illustrating a conventional known type plotting apparatus—guide rods $a$ and $b$ are universally jointed at points I and II (in general stationary), while coupling joints 1 and 2, slidable along them, are borne by means of arms projecting from a horizontal cross-bar 3, in its turn supported by a central carriage 4 movable vertically along a column 5 according to the value of Z. In its turn the column 5 is movable along a horizontal guide 6 according to the value of X, and finally the latter is movable according to the value of Y along two parallel guides 7 and 7' carried by a base 8.

In said FIG. 1 it is possible to see how the arm connecting the joint 1 to the cross-bar 3 allows relative vertical movement when the arm moves a distance $bz$ along the axis Z, while the joint 2 may slide in the horizontal direction a distance $by$ and finally how the supports of both joints may slide in the horizontal direction along the cross-bar 3 a distance $bx$ relatively to the base. Generally the cross-bar 3 is sufficiently long the allow the joints 1 and 2 to reach the positions 1' and 2' at a spacing such that, by substracting the value of the distance between the joints I and II therefrom, it is possible to determine the value of the component $bx$. The position, called external base, is alternately used with (1-2) (called internal base) to construct stereoscopic models (aerial triangulation). It is to be noted that, while in the internal base position the operator, with the left eye, observes the left hand photogram and the right hand photogram with the right eye; in the external base position the operator's right eye must observe the left hand photogram and vice versa so that optical paths cross. This is carried out in different ways in known instruments. On the other hand for higher accuracy of the plots the essential condition is that said joints 1 and 2, and 1' and 2', during the movements X, Y, Z of the carriages supporting them, describe identical movements in the space. The result therefore, as is obvious from FIG. 1, is that owing to the greater distance between the positions 1' and 2' than between 1 and 2, the external base plotting must have a sensibly lower accuracy than that of the internal base.

In FIG. 2, where the coupling scheme of the guide rods to the carriages according to the invention is represented, it is to be noted that, with respect to FIG. 1, the two photograms $f_1$ and $f_2$ are rotated by 90° about the connecting line I–II and each is rotated by 90° in its own plane. Therefore, with reference to a series of aerial photograms, while in the case of FIG. 1 the flight direction DV is approximately parallel to the line connecting the projection centres I and II; in the case of FIG. 2, the direction DV is approximately normal to said connecting line.

From the same FIG. 2 it is evident how the two projection centres are independently movable in the horizontal plane. In the average or middle (fundamental) position they are at the same distance from the coupling joints 1 and 2 along the rods $a$ and $b$. The carriage 9 is movable vertically and carries two parallel vertical guides 9' and 9", along which the supporting arms of the joints 1 and 2 may slide and be fixed. From the described arrangement it results that the base component $bx$ is oriented in the vertical direction in a plane normal to the line connecting the projection centres I–II; that said component may be imposed by sliding the joints 1 and 2 along the guides 9' and 9" and that in order to pass from the internal base to be external base, it is sufficient to slide the supports of said joints vertically in the opposite direction so as to bring them into the positions 1 and 2 or 1' and 2'.

The remarkable advance achieved with this invention is that the distances between the coupling joints 1 and 2, and 1' and 2' are substantially equal for the same linkage, so as to maintain in all the models of the series of photograms, the same degree of accuracy.

In the embodiment of FIG. 2 it is shown how the projection centres I and II are supported by a cross-bar 10 with the interposition of slides 11 and 12.

It is thus possible to move the projection centre I to impose a component $bz$ and a movement of centre II to impose at component $by$. In another embodiment, said movements $by$ and $bz$ could be transfered by suitable means to the joints 1 and 2 with respect to the vertical guides 9' and 9". From FIG. 2 it can be seen that the carriage bearing the guides 9' and 9" is movable in the vertical direction along the X axis, while the carriage 13 is movable along the guide 14 in the Y direction and finally a support 15 of the latter is movable along guides 16 and 16' to determine the movement Z.

In FIG. 3, which illustrates a structural form of the instrument and which shows the so-called viewing chambers, it is to be noted how above the cross-bar 10, by means of the slides 11 and 11', and 12 and 12' both chambers may be moved so as to impose the components $by$ and $bz$.

In the partial representation of the left hand chamber it is to be noted how above the slide 11 a plate 17 is located, which plate, by means of a toothed sector and a tangential screw 19, may rotate around a vertical axis passing through the centre of the universal joint I. The plate 17 supports the frame 19 which in its turn supports the universal joint of the guide rod. The rotational vertical axis of the plate 17 therefore forms which is generally called the $\omega$ (omega) axis. The frame 19 by means of two pins, supports an outer frame formed by two limbs 20 joined to each other by a tubular cross-member $20x$ shown in broken lines. This frame may thus rotate around a horizontal axis called the $\varphi$ (phi) axis. Said frame, by means of a toothed sector borne thereby and a tangential screw 21, may be rotated. Moreover, the two limbs 20 carry two parallel guides 20' which are horizontal in the fundamental position and along which a plate 22 may slide under the action of a micrometer screw 23 for the purpose of adjusting the focus distance to reproduce the value of the camera used to take the photograms. In its turn the plate 22 supports a disc 24, shown dotted in the left hand viewer and in solid lines in the right hand viewer. In disc 24 is a square window in which the photogram-carrier frame is fixed by suitable means. The disc may rotate about its axis by means of a tangential screw 25 for the purpose of imposing the so-called K value to the photogram.

The plate 22 supports two collars 26. As shown in the right hand viewer, the collars 26 are designed to define the rotational axis $m$–$m'$ of the first arm 27 of the optical system. Said arm 27 supports a second arm 28 for pivotal movement about axis $n$–$n'$. The free end of arm 28 supports a right angle prism 29 and is connected by means of a universal joint to the slidable end portion $b'$ of the guide rod $b$. All the parts of the optical system in the interior of the arm 28 are illustrated more clearly in FIG. 5. In this figure are shown the right angle prism 29, the object lens 31, the mirrors 32 and 33, and the small glass 34 on which the collimation mark is engraved, of which mark the object lens 31 forms the partial image on the photogram. The mark 34 is generally a small opaque point. It may be replaced by a luminous point produced by a lamp 35 which illuminates a small hole 36 in a diaphragm, while a small lens 37 produces a virtual image of the filament in place of the black mark 34 by means of a semi-reflecting surface situated between two right angle prisms 34$a$ secured together and located in front of the mark 34. The optical path thus lies in the interior of the arm 28 as described above.

The additional optical path to an eyepiece of the device includes two right angle prisms 38 and 39 carried by the arm 27, and lie respectively on the axes $n$–$n'$ and $m$–$m'$, which deflect the collimation axis so that it goes through a lens 42 which receives both the image of the mark 34 and of part of the respective photogram and projects them through prisms 40 and 41, an Amici prism 43, a second lens 44 and right angle prisms 45 and 46 which form an image in the focal plane of an eyepiece lens 47. The prisms 40 and 41 and their associated supporting tubes do not rotate with the arm 27. The prisms 45 and 46, situated near the eyepiece, although they are shown for clarity to be arranged in a symmetrical manner, in fact are arranged as shown in FIG. 6, which shows the optical paths as being crossed, which is required when the so called external base is set up. The internal base position is not shown in the drawings as it is easily set up by simply changing the position of the eyepieces.

From FIG. 6 it will be seen how the prisms 44 and 45 may be rotated relatively to each other according to the directions of the incident and emergement beams. A similar arrangement is also provided for the prisms 40 and 41. Moreover, the length of the optical path between the lenses 42 and 44, containing the Amici prism 43, includes telescopic tubes, which allow variation of the distance between the prisms 41 and 45 as required by the movements of the two screens by the imposition of the components $by$ and $bz$ by rotation about the $\omega$ and $\varphi$ axes.

The parts hitherto described do not include the correction members mentioned earlier. They are four, that is two cams $ax$ and $ay$ for correction of the image errors, and two cams $sx$ and $sy$ for the correction of instrument errors. Their position for the right hand viewer is diagrammatically represented in FIG. 4, the arrangement for the left hand viewer being allochiral.

As shown in FIGS. 3 and 5, the arm 28 has an extension 28' which, besides supporting an arm carrying a lamp and the mirror 28" for zone illumination of the photogram, carries one end of a connecting rod 48 (FIGS. 4 and 5). Moreover the member 27 has an extension 27' which rotates with it about the axis $m$–$m'$ and which carries a pin forming the central pivot of a lever 49 which is connected by a further pin to the lever 48 so as to form parallelogram linkage. The free end of the lever 49 carries a cylindrical cross-member or cam follower 49' (FIG. 5) with rounded ends, against which lie the surfaces of the cams $sy$ and $ax$, which are biased by springs. In addition the free end of the connecting rod 48' has a similar cross-member against which the cams $sx$ and $ay$ bear. As shown in FIG. 4, the points of contact of the cross-members with the cams reproduce, with a known reduction, the movements of the centre of the prism 29 with respect to the photogram. Therefore there is a correlation between the point on the photogram aligned with the collimation axis and the contact points with the cams.

In FIG. 7 is shown on a larger scale than FIG. 4, the parallelogram linkage, as well as the members designed to compensate for the deformations of the image. The frame 50 to which the photogram $f$ is fixed, is assembled on the ring 24 where it is positioned by levers 52, 52' and 53 and by the associated biassing springs. The surface containing the image contacts a fixed plate 51 (see FIG. 5), on which the control indicia are engraved. The levers 52 and 52' are connected to one another by means of a connecting rod 54 provided with a projection 54' against which rests an extension of a lever 55 (see also FIG. 8). The other end of the lever 55 carries a roller in contact with a plate 56 which, by means of the lever 57 and the levers 57' and 57" forming a parallelogram, moves with the cam $ax$ to induce in the photogram $f$ movements in the vertical direction compensating for the incidental error according to the component X. The movements of the cam $ax$ are induced by the movement in a plane parallel to the photogram of the follower 49' connected to the lever 49. The other arm 48 of the respective parallelogram carries the second follower 48' which is similarly moved against the cam $ay$ which, through the lever 58, the plate 59, the lever 60 and the lever 53 produces horizontal movement of the photogram corresponding to the incidental errors $ay$ of the photogram. It is also to be noted that owing to the shape of the plates 56 and 59, which always present a contact surface for the rollers parallel to the photogram, the latter is able to rotate in its own plane to introduce the value K, within limits. The correction devices $ax$ and $ay$, if considered necessary could each be rotatable around its own centre.

For clarity, in FIG. 8 the arrangement of the levers 58, 60 and 53 has not been illustrated as it can be deduced from FIG. 7. The pivots of the different levers are carried by extensions carried by the support 22 (FIG. 3).

Adjustment of the forms of the cams $ay$ and $ax$ is effected by means of a set of screws 61 carried by a plate 62 as shown in FIGS. 7 and 8 and shown in detail in FIGS. 10 and 11. The deformable surfaces of these cams may be formed with a triangular shape, or also (as is shown in FIGS. 10 and 11) by means of thin steel strips 63 secured to a sheet 64 of elastomeric material which also houses the spherical ends of the screws 61 leaving them free to rotate. Owing to the magnitude of the desired corrections—generally of the order of a few hundredths of a millimeter—the cams may represent the errors to be corrected on a large scale, for instance 50:1.

In order to adjust the two cams $ay$ and $ax$ for a particular photogram $f$ already assembled on the disc 24, the operator must bring into correspondence the different control indicia, usually in the form of crosses, on both the photogram and the glass plate 51 against which said photogram lies. If the indicia do not coincide the screws 61 on the cam $ax$ and on the cam $ay$ are adjusted accordingly so that the operator can begin the plotting. As in most cases deformations due to contraction of the film in the longitudinal direction and in the transversal one remain substantially constant for all the photograms belonging to a series, the gross adjustment of the cams $ax$ and $ay$ also remains practically constant only small local adjustments being required for deformations having a real incidental character.

An arrangement similar to the one described is provided for the correction of the residual projection errors depending on the instrument. In order to pick up these errors, a standard reticule such as that plate carrying the control indicia, is mounted in place of the photogram. Effecting the collimation for each crossing point for a known position of the carriage Z (see FIGURES 1 and 2), enables the co-ordinates to be read on accurate scales arranged along the guides of the carriages X and Y. The residual projection defects are detected as deviations $dx$ and $dy$ of the different readings from an average value. It is also possible, through the stereoscopic collimation with two reticules simultaneously mounted in the viewers, to detect the altitude errors $dz$. The correction device for the errors $dx$ and $dy$ for each viewer (and thus of $dz$) is formed by a flat parallel-sided glass plate 65 (see FIG. 9, which shows the disc 24 on the side opposite to the side shown in FIG. 7) mounted in gimbals in the interior of the disc 24 in such a manner that a primary ring 66 may rotate about a vertical axis $v$—$v$, while in its turn the support 67 of the glass plate 65 may rotate about the secondary horizontal axis $t$—$t$. Rotation about the primary axis $v$—$v$ is induced by the cam $sy$ through levers 68 and 69, while rotation about the secondary axis $t$—$t$ is induced by the cam $sx$ through levers 70 and 71. Suitable biassing springs, not shown in the drawings, ensure rotation in the two directions.

The adjustment of the cams $sx$ and $sy$ is effected now and then by the operator for an average value of Z, through the subsequent collimation of all the reticule crosses, effecting for each thereof reading of the co-ordinates $x, y$ on the carriage scales. If these do not correspond to the theoretical readings, taking account of the amplification $Z/f$ ($f$=focus of the camera used to take the photograms), the operator will impose the corrected readings on the scales and will obtain coincidence of the reticules by inclining the plate 65 by means of adjusting screws 61 of the cams $ax$ and $ay$. Said screws will be in such a position as to correspond to the points of the reticule taking into account the reduction ratio between the collimation optical system of the photogram and that accomplished by the contacting rods with the cams.

In place of the universal joint 30 for coupling the arm 28 (see FIG. 3) to the guide rod $b$ a mechanical correction device for the distortion of the object lens of the camera of the known Santoni type, may be mounted. Also the glass plate 51 may be suitably aspherical on the side of the prism 29. With the devices forming part of the invention, the cams $sx$ and $sy$ may also be entrusted with the task of compensating for said distortion (both radial and tangential), by simply computing the corresponding values of the co-ordinates X and Y which must be read on the relative scales for a known value of Z. Therefore the correction of the residual instrument errors and the compensation of the distortion of the object lens of the camera will be collectively obtained. Where it would be appropriate, the glass plate 51 could be replaced temporarily by another one on which many indicia would be engraved in such a position as to take account of the distortion of the camera lens; said plate could be easily obtained photographically by means of projecting through the camera lens a suitable reticule by means of conventional goniometer such as is used by manufacturers for calibration of their cameras.

What I claim is:

1. Photogrammetric apparatus of the class described, comprising: a pair of first supporting means each for mounting one of a stereoscopic pair of aerial photographs in substantially coplanar relationship; a pair of second supporting means each mounted for angular displacement about a fixed pivotal axis located outwardly beyond said photographs and extending normal to the plane thereof; a pair of third supporting means each carried by one of said second supporting means, each third supporting means being connected to one of said second supporting means for angular displacement about a pivotal axis spaced at a fixed distance from and parallel to said fixed axis; a pair of scanning members each carried by one of said third supporting means for movement in a plane spaced from and parallel to one of said photographs; a pair of horizontally spaced eyepieces for stereoscopic viewing; means defining two optical paths of equal constant lengths, each path extending between one of said scanning members and one of said eyepieces; index mark means including illumination means for producing a index mark for each photograph in a fixed position with respect to one of said scanning members, whereby both scanning members may be positioned for simultaneous observation of the same point of terrain on both photographs of said stereoscopic pair by reference to said index marks; a pair of guide rod members each pivoted intermediate its ends for angular displacement in all directions about a fixed point; a pair of universal joint means each connecting one end of one of said rod members to one of said scanning members for displacement therewith, each universal joint means including means for axial elongation of its associated guide rod member intermediate said fixed point and said one end; altitude determining means movable in three mutually perpendicular directions, two of said directions defining a plane parallel to the plane of said photographs, movement of said determining means in the third of said directions corresponding to variations in the altitudes of different ones of said same points of terrain when simultaneously observed by both of said scanning means; a pair of first positioning means each included in one of said first supporting means for displacing the photograph carried thereby in the first of said mutually perpendicular directions; a pair of second positioning means each included in one of said first supporting means for displacing the photograph carried thereby in the second of said mutually perpendicular directions; a pair of pantograph means each connected to the second and third supporting means of one of said pairs for displacement with one of said scanning members; two cam members carried by each of said pantograph means; two cam follower members each controlled in response to the position of one of said cam members, one of said follower members being connected to control one of said first positioning members and the other follower member being connected to control one of said second positioning members for imparting corrective displacements in said first and second directions separately to each of said photographs.

2. Apparatus according to claim 1, wherein each of said cam members moves in a plane parallel to the plane of said photographs with effectively point contact with its associated follower, and in which each follower member comprises a contour surface engaged by said cam member and extending over an area corresponding to the area of one of said photographs, said contour being shaped to impart a corrective displacement to one of said displacement members in correspondence with the correction appropriate for any particular area of said photograph wherein said same point of terrain is located.

3. Apparatus according to claim 2, wherein said contour surface is defined by a series of closely spaced parallel rectangular deformable strip members, said follower further comprising a series of adjustment screws spaced along the longitudinal axis of each strip member for individually adjusting the contour of each strip member through its length.

4. Apparatus according to claim 1, further comprising a pair of transparent plates each carried by one of said first supporting members, each plate being positioned intermediate one of said scanning members and one of said photographs and extending generally parallel to the plane of said photograph at least coextensively therewith; gimbal means connecting each of said plates with one of said first supporting members for rotation about intersecting axes parallel, respectively, to the first and second of said three mutually perpendicular directions; two further cam members carried by each of said pantograph means; two further cam follower members each controlled in response to the position of one of said further cam members, one of said follower members being connected to rotate said plate about one of said intersecting axes and the other follower member being connected to rotate said plate about the other thereof, each plate carrying reference marks for observation simultaneously with one of said photographs.

5. Apparatus according to claim 4, wherein each of said further cam members moves in a plane parallel to the plane of said photographs with effectively point contact with its associated follower; and in which each further follower members comprises a contour surface engaged by said further cam member and extending over an area corresponding to the area of one of said photographs, said contour being shaped to impart a corrective angular displacement to one of said plates in correspondence with the correction appropriate for any particular area of said photograph wherein said same point of terrain is located.

6. Apparatus according to claim 5, wherein said contour surface is defined by a series of closely spaced parallel rectangular deformable strip members, said follower further comprising a series of adjustment screws spaced along the longitudinal axis of each strip member for individually adjusting the contour of each strip member throughout its length.

References Cited by the Examiner
UNITED STATES PATENTS

| | | | |
|---|---|---|---|
| 2,797,579 | 7/1957 | Blachut et al. | 33—20 X |
| 2,803,992 | 8/1957 | Baboz | 88—29 X |
| 2,847,906 | 8/1958 | Santoni | 88—29 |
| 2,859,520 | 11/1958 | Meijer | 88—29 X |

JEWELL H. PEDERSEN, *Primary Examiner.*

O. B. CHEW, *Assistant Examiner.*